United States Patent
Jang

(10) Patent No.: US 11,446,120 B2
(45) Date of Patent: Sep. 20, 2022

(54) BOLT-TYPE IMPLANT

(71) Applicant: Heesung Jang, Busan (KR)

(72) Inventor: Heesung Jang, Busan (KR)

(*) Notice: Subject to any disclaimer, the term of this patent is extended or adjusted under 35 U.S.C. 154(b) by 194 days.

(21) Appl. No.: 16/961,258

(22) PCT Filed: Jan. 15, 2019

(86) PCT No.: PCT/KR2019/000582
§ 371 (c)(1),
(2) Date: Jul. 10, 2020

(87) PCT Pub. No.: WO2019/143096
PCT Pub. Date: Jul. 25, 2019

(65) Prior Publication Data
US 2021/0059792 A1 Mar. 4, 2021

(30) Foreign Application Priority Data

Jan. 16, 2018 (KR) ........................ 10-2018-0005796

(51) Int. Cl.
*A61C 8/00* (2006.01)
(52) U.S. Cl.
CPC .................................. *A61C 8/0051* (2013.01)
(58) Field of Classification Search
CPC ........................... A61C 8/0051; A61C 8/0022
See application file for complete search history.

(56) References Cited

U.S. PATENT DOCUMENTS

| | | | | |
|---|---|---|---|---|
| 3,919,772 A | * | 11/1975 | Lenczycki | A61C 8/001 433/173 |
| 4,016,651 A | * | 4/1977 | Kawahara | A61C 8/001 285/911 |
| 4,177,562 A | * | 12/1979 | Miller | A61C 8/0089 433/174 |
| 4,516,937 A | | 5/1985 | Bosker | |
| 4,762,492 A | * | 8/1988 | Nagai | A61C 8/0019 433/176 |
| 5,439,381 A | * | 8/1995 | Cohen | A61C 8/0033 433/177 |
| 5,456,601 A | * | 10/1995 | Sendax | A61C 8/0009 433/173 |

(Continued)

FOREIGN PATENT DOCUMENTS

KR 10-2010-0012967 A 2/2010
KR 10-2012-0010343 A 2/2012
(Continued)

OTHER PUBLICATIONS

International Search Report for PCT/KR2019/000582 dated May 23, 2019 from Korean Intellectual Property Office.

*Primary Examiner* — Ralph A Lewis
(74) *Attorney, Agent, or Firm* — Revolution IP, PLLC

(57) ABSTRACT

A bolt-type implant includes: a bolt (12) configured to be inserted into a vertical hole drilled in a mandible (including an alveolar bone) at a position in which the implant will be placed; a nut (20) configured to be fitted to the bolt inserted into the mandible and fix the bolt to the mandible (including the alveolar bone); and an abutment (11) formed on a bolt head of the bolt so as to constitute a single body with the bolt and configured to be connected to a crown (artificial tooth).

1 Claim, 3 Drawing Sheets

(56) References Cited

U.S. PATENT DOCUMENTS

| | | | | | |
|---|---|---|---|---|---|
| 5,975,903 | A | * | 11/1999 | Shoher | A61C 8/001 433/173 |
| 8,562,348 | B2 | * | 10/2013 | Collins | A61K 6/884 433/174 |
| 10,045,837 | B2 | * | 8/2018 | Willis | A61C 8/0009 |
| 2015/0250566 | A1 | * | 9/2015 | Mozo Grau | A61C 8/0089 433/174 |
| 2015/0313689 | A1 | * | 11/2015 | Horvath | A61C 8/0034 606/282 |
| 2015/0374466 | A1 | * | 12/2015 | Jahn | A61C 8/0068 433/213 |
| 2021/0059792 | A1 | * | 3/2021 | Jang | A61C 8/0051 |

FOREIGN PATENT DOCUMENTS

| | | | |
|---|---|---|---|
| KR | 10-1559823 | B1 | 10/2015 |
| KR | 10-1642743 | B1 | 7/2016 |

\* cited by examiner

BOLT-TYPE IMPLANT

TECHNICAL FIELD

The present invention relates to a bolt-type implant, which is a dental implant.

BACKGROUND ART

Existing dental implants are the background art of the present invention. Generally, existing implants serve to replace natural teeth. First, the gum is cut open, a hole is drilled in the alveolar bone, a fixture (artificial dental root) made of metal is placed in the hole, and, when integration of the fixture with the bone (which is referred to as "osseointegration") occurs, an abutment is coupled to the fixture, and a crown (artificial tooth) is attached to the abutment. In this way, an implant treatment is completed.

DISCLOSURE

Technical Problem

In a conventional implant, since a fixture is fixed only when osseointegrated with the mandible or maxilla (including an alveolar bone), a separate abutment is required in addition to the fixture. Also, typically, a screw is used to connect the abutment to the fixture. Thus, the shapes of the fixture and the abutment may become complex, a connection portion between the fixture and the abutment may be weak and malfunction, and the complex structure may allow bacterial colonization and increase the likelihood of infection.

Also, since a force that fixes the implant is obtained by osseointegration of the fixture, the fixture is necessary to have a certain size. Thus, it is inevitable to cut out a large portion of the mandible or maxilla, and serious damage occurs in the mandible or maxilla. Also, it is not easy to perform an implant treatment on people with little or no alveolar bone.

In addition, since it takes a long time for the fixture to be osseointegrated, the implant treatment period is prolonged.

Technical Solution

In order to address the drawbacks of a conventional implant that have been pointed out above, a bolt-type implant is fixed to the mandible (including an alveolar bone) by a coupling force between a bolt and a nut, instead of osseointegration.

In addition, a fixture and an abutment of the conventional implant are combined as one body so that the structure of the implant is simplified further.

Advantageous Effects

The advantageous effects of a bolt-type implant according to the present invention are as follows.

First, since the implant has a simple structure including a bolt and a nut, the durability of the implant is high, and the same support force can be obtained even when a diameter of the bolt is made smaller than a diameter of a fixture of a conventional implant.

Second, since the diameter of the bolt is smaller than the diameter of the fixture of the conventional implant, it is not necessary to cut out a large portion of the mandible or maxilla (including an alveolar bone), and damage to the mandible or maxilla is small.

Third, since the implant is supported by a coupling force between the bolt and the nut, a force that supports the implant is maintained even when there is little or no alveolar bone.

Fourth, since the structure is simpler than that of the conventional implant, the likelihood of bacterial infection is low.

Fifth, since time for osseointegration of a fixture is not required, the implant treatment period is significantly reduced.

Sixth, in a case in which a problem occurs in a previously-placed implant and the implant needs to be removed, it is easier to remove the implant because the bolt-type implant has the structure including a bolt and a nut and has a smaller volume than the conventional implant which requires osseointegration.

DESCRIPTION OF REFERENCE NUMERALS

Figure 1:
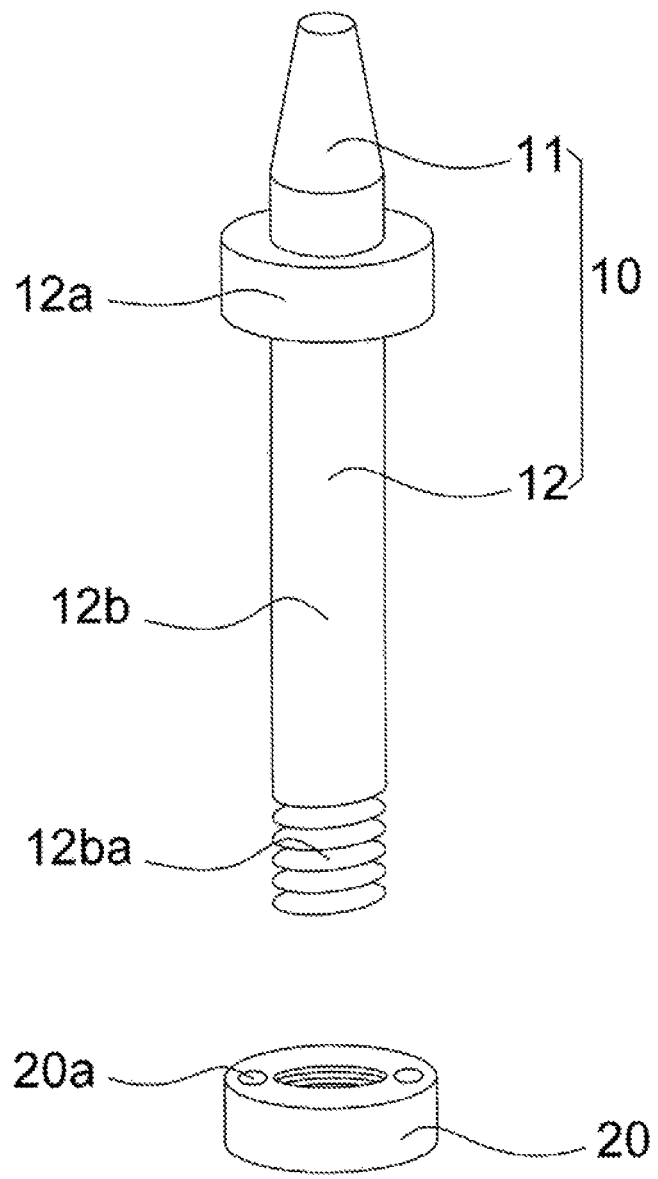
FIG. 1 is a perspective view of a bolt-type implant that includes an implant main body (10) and a nut (20).
Figure 2:
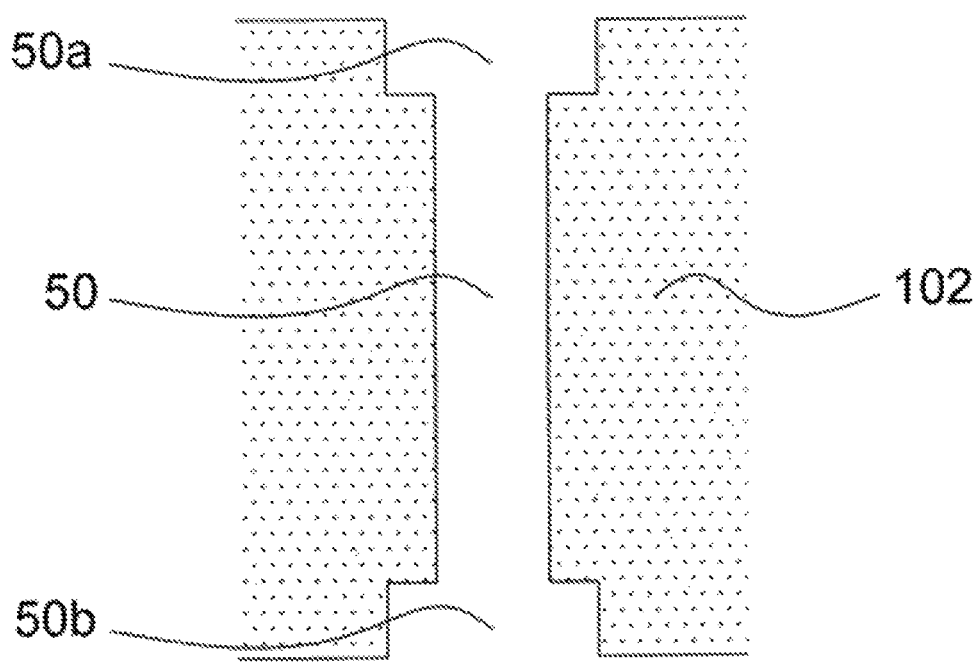
FIG. 2 is a cross-sectional view of a hole drilled in the mandible (including an alveolar bone) using a drill in order to place the bolt-type implant. (The size (diameter) of the hole is larger at the top and the bottom than in the middle because a bolt head (12a) is inserted through the top and the nut (20) is inserted through the bottom).
Figure 3:
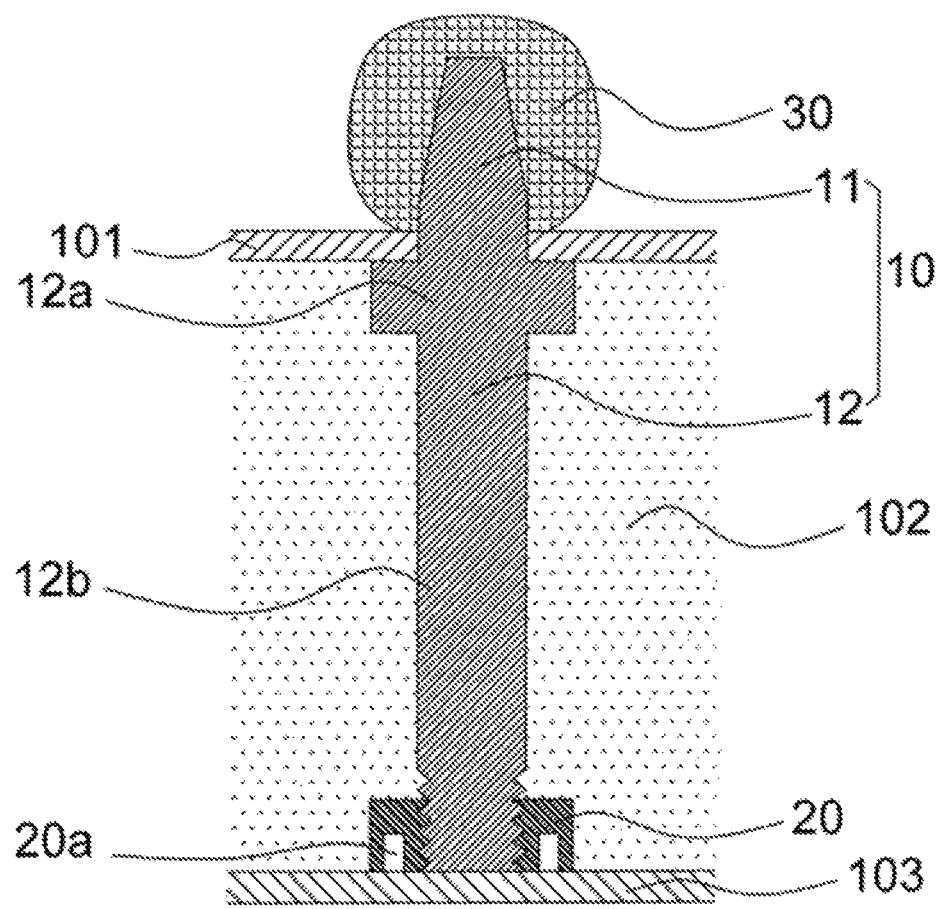
FIG. 3 is an overall cross-sectional view of the bolt-type implant after the implant treatment is completed.

10: implant main body (refers to a single body formed by combination of an abutment and a bolt)
11: abutment
12: bolt
12a: bolt head
12b: bolt body
12ba: screw portion formed at the end of the bolt body
20: nut
20a: groove formed in the nut (groove used when screwing or unscrewing the nut using a driver)
30: crown (artificial tooth)
50: hole drilled in the mandible to insert a bolt-type implant
50a: top portion of the hole (50) drilled in the mandible where the size (diameter) of the hole is increased to insert the bolt head (12a)
50b: bottom portion of the hole (50) drilled in the mandible where the size (diameter) of the hole is increased to insert the nut (20)
101: gum
102: mandible (including an alveolar bone)
103: skin under the mandible

BEST MODE OF THE INVENTION

A bolt-type implant according to the present invention includes an implant main body 10 and a nut 20.

Also, the implant main body 10 is divided into an abutment 11 and a bolt 12, but the abutment and the bolt are connected and constitute a single body.

The abutment is formed to be connected to an upper portion of a bolt head 12a.

Regarding functions of components, the bolt and the nut serve to fix the entire implant to the mandible, and the abutment serves to connect a crown (artificial tooth) to the bolt and support the crown.

In the drawings, the shape of the abutment is illustrated on the assumption that the crown is connected to the abutment using a method commonly used during a conventional implant treatment, that is, a method in which the crown is connected to the abutment after an adhesive is applied to the abutment.

Methods other than using an adhesive may also be considered for attaching the crown to the abutment, but detailed descriptions thereof will be omitted because such methods are irrelevant to the gist of the present invention, and any method may be used as long as the abutment is able to be connected to the crown and support the crown.

Embodiment

Steps for placing the bolt-type implant will be described with reference to the drawings.

First, the implant main body 10 and the nut 20 are prepared.

Second, a gum at a position where the implant will be placed and skin under a mandible 102 which is under the gum are cut.

Third, a vertical hole 50 is drilled in the mandible 102 using a drill, and top and bottom portions 50*a* and 50*b* of the drilled hole 50 are made larger using a drill.

This is to allow the bolt head 12*a* to be inserted through the top portion 50*a* and the nut 20 to be inserted through the bottom portion 50*b* when placing the implant main body and the nut.

Fourth, the implant main body is inserted into the hole 50 in the mandible from top to bottom, and the nut is fitted and fastened to a screw portion formed at a lower portion of a bolt body protruding downward from the hole in the mandible.

Fifth, the gum and the skin under the mandible are sutured. Here, a top portion of the abutment protrudes to the outside of the gum.

Sixth, a crown is produced and connected to an abutment. In this way, a treatment for placing the bolt-type implant is completed.

INDUSTRIAL APPLICABILITY

A bolt-type implant may be used in replacing a natural tooth of patients who lost a tooth.

The invention claimed is:
1. A dental implant having a bolt shape, the dental implant comprising:
a bolt (12) having a first end and a second opposite end configured to be entirely inserted into a vertical hole drilled in a mandible at a position in which the implant will be placed;
a bolt head having a cylinder shape with first and second opposite ends, the first end of the bolt head directly connected to the first end of the bolt, wherein an outer diameter of the bolt head is larger than an outer diameter of the bolt;
a nut (20) configured to be fitted to the second end of the bolt inserted into the mandible and fix the bolt to the mandible; and
an abutment (11) formed on the second end of the bolt head so as to constitute a single body with the bolt and bolt head, the abutment configured to be connected to a crown,
wherein the outer diameter of the bolt head is larger than an outer diameter of the abutment,
wherein one end of the abutment is cylindrical, and an outer diameter thereof gradually decreases toward the other end the abutment.

* * * * *